United States Patent [19]

Plank et al.

[11] 4,105,541
[45] Aug. 8, 1978

[54] HYDROCARBON CONVERSION OVER ZSM-38

[75] Inventors: Charles J. Plank, Woodbury, N.J.; Mae K. Rubin, Bala Cynwyd, Pa.; Edward J. Rosinski, Pedricktown, N.J.

[73] Assignee: Mobil Oil Corporation, New York, N.Y.

[21] Appl. No.: 850,876

[22] Filed: Nov. 14, 1977

Related U.S. Application Data

[63] Continuation-in-part of Ser. No. 808,202, Jun. 20, 1977, abandoned, which is a continuation-in-part of Ser. No. 560,412, Mar. 20, 1975, Pat. No. 4,046,859, which is a continuation-in-part of Ser. No. 528,060, Nov. 29, 1974, abandoned, which is a continuation-in-part of Ser. No. 393,767, Sep. 4, 1973, abandoned, which is a continuation-in-part of Ser. No. 358,192, May 7, 1973, abandoned.

[51] Int. Cl.² .................... B01J 8/24; C07C 15/02; C01B 29/28
[52] U.S. Cl. .................... 208/111; 208/46; 208/120; 208/135; 252/455 Z; 260/673; 260/673.5; 260/683.15 R; 423/428
[58] Field of Search ................ 208/111, 46, 120, 135; 260/673, 673.5

[56] References Cited

U.S. PATENT DOCUMENTS

| | | | |
|---|---|---|---|
| 2,531,427 | 11/1950 | Hauser | 260/448 C |
| 3,642,434 | 2/1972 | Dwyer | 423/329 |
| 3,702,886 | 11/1972 | Argauer et al. | 423/328 |
| 3,748,251 | 7/1973 | Demmel et al. | 208/74 |
| 3,804,746 | 4/1974 | Chu | 208/111 |
| 3,843,741 | 11/1974 | Yan | 260/673.5 |
| 3,923,639 | 12/1975 | Ciric | 208/111 |
| 3,960,978 | 6/1976 | Givens et al. | 260/683.15 R |
| 3,970,544 | 7/1976 | Rosinski et al. | 208/111 |
| 4,021,331 | 5/1977 | Ciric | 208/111 |

*Primary Examiner*—Delbert E. Gantz
*Assistant Examiner*—G. E. Schmitkons
*Attorney, Agent, or Firm*—Charles A. Huggett; Dennis P. Santini

[57] ABSTRACT

Catalytic conversion of hydrocarbon compounds in the presence of crystalline zeolite ZSM-38, or a thermal decomposition product thereof, is provided. Zeolite ZSM-38 has a composition, in the anhydrous state, expressed in terms of mole ratios of oxides as follows:

$$(0.3-2.5)R_2O:(0-0.8)M_2O:Al_2O_3:(x)SiO_2$$

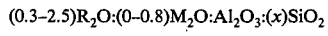

wherein R is an organic cation, especially an organic nitrogen-containing cation, M is an alkali metal cation and $x$ is greater than 8, and is characterized by a specified X-ray powder diffraction pattern.

29 Claims, No Drawings

HYDROCARBON CONVERSION OVER ZSM-38

CROSS-REFERENCE TO RELATED APPLICATIONS

This is a continuation-in-part of application Ser. No. 808,202, filed Jun. 20, 1977, now abandoned, which was a continuation-in-part of application Ser. No. 560,412, filed Mar. 20, 1975, now U.S. Pat. No. 4,046,859, which was a continuation-in-part of application Ser. No. 528,060, filed Nov. 29, 1974, now abandoned, which was a continuation-in-part of application Ser. No. 393,767, filed Sep. 4, 1973, now abandoned, which was a continuation-in-part of application Ser. No. 358,192, filed May 7, 1973, now abandoned.

BACKGROUND OF THE INVENTION

1. Field of the Invention

This invention relates to hydrocarbon conversion in the presence of a novel crystalline aluminosilicate zeolite designated ZSM-38.

2. Description of the Prior Art

Zeolitic materials, both natural and synthetic, have been demonstrated in the past to have catalytic properties for various types of hydrocarbon conversions. Certain zeolitic materials are ordered, porous crystalline aluminosilicates having a definite crystalline structure within which there are a large number of smaller cavities which may be interconnected by a number of still smaller channels. These cavities and channels are precisely uniform in size. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen is 1:2. The electrovalence of the tetrahedra containing aluminum is balanced by the inclusion in the crystal of a cation, for example, an alkali metal or an alkaline earth metal cation. This can be expressed wherein the ratio of aluminum to the number of various cations, such as Ca/2, Sr/2, Na, K or Li is equal to unity. One type of cation may be exchanged either entirely or partially by another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic aluminosilicates. These aluminosilicates have come to be designated by letter or other convenient symbols, as illustrated by zeolite A (U.S. Pat. Nos. 2,882,243), zeolite X (2,882,244), zeolite Y (3,130,007), zeolite ZK-5 (3,247,195), zeolite ZK-4 (3,314,752) and zeolite ZSM-5 (3,702,886), merely to name a few.

One such crystalline aluminosilicate, a rare natural zeolite, is ferrierite. Ferrierite has been described by Graham (Boy. Soc. Canada, Proc. and Trans., 3rd Ser., 12, 185-190) and by Staples (Am. Mineral. 40, 1095-99). The formula of the natural mineral ferrierite is given as $(Na, K)_4 Mg_2 (Si_{30}Al_6) O_{72}(OH)_2 \cdot 18 H_2O$. Barrer and Marshall (Am. Mineral. 50,484-85) in 1965 reexamined the X-ray powder diffraction pattern of a strontium zeolite Sr-D, synthesized by Barrer and Marshall in 1964 (J. Chem. Soc., 485-89) and concluded that it was closely related to natural ferrierite. A synthetic sodium form was briefly described by Senderov (Geokhimiya 9, 820-29) and a Ca-Na form of ferrierite produced by Coombs, Ellis, Fyfe and Taylor (Geochem. Cosmochim. Acta 17, 53-107) was not identified as such.

SUMMARY OF THE INVENTION

The present invention relates to the use of a synthetic crystalline aluminosilicate, hereinafter designated "zeolite ZSM-38" or simply "ZSM-38", as a catalyst for hydrocarbon conversion. The ZSM-38 composition has a characteristic X-ray diffraction pattern, the values of which are set forth in Table 1, hereinafter. The ZSM-38 composition can also be identified, in terms of mole ratios of oxides and in the anhydrous state, as follows:

wherein R is an organic cation, M is an alkali metal cation and x is greater than 8. It will be noticed that the ratio of $R_2O$ to $Al_2O_3$ may exceed unity in this material due to the occlusion of excess organic species ($R_2O$) within the zeolite pores.

In a preferred synthesized form, the zeolite has a formula, in terms of mole ratios of oxides and in the anhydrous state, as follows:

wherein R is an organic nitrogen-containing cation, especially a cation derived from a 2-(hydroxyalkyl)-trialkylammonium compound wherein alkyl is methyl, ethyl or a combination thereof, M is an alkali metal, especially sodium, and y is from greater than 8 to about 50.

The original cations of the as synthesized ZSM-38 can be replaced in accordance with techniques well known in the art, at least in part, by ion exchange with other cations. Preferred replacing cations include metal ions, ammonium ions, hydrogen ions and mixtures thereof. Particularly preferred cations are those which render the zeolite catalytically active. These include hydrogen, rare earth metals, aluminum and metals of Groups IB, IIB, IIIB, IVB, VIB, VIII, IIA, IIIA and IVA of the Periodic Table of Elements.

The synthetic ZSM-38 zeolite possesses a definite distinguishing crystalline structure whose X-ray diffraction pattern shows substantially the significant lines set forth in Table 1.

TABLE 1

| d(A) | I/Io |
|---|---|
| 9.8 ± 0.20 | Strong |
| 9.1 ± 0.19 | Medium |
| 8.0 ± 0.16 | Weak |
| 7.1 ± 0.14 | Medium |
| 6.7 ± 0.14 | Medium |
| 6.0 ± 0.12 | Weak |
| 5.0 ± 0.10 | Weak |
| 4.37 ± 0.09 | Weak |
| 4.23 ± 0.09 | Weak |
| 4.01 ± 0.08 | Very Strong |
| 3.81 ± 0.08 | Very Strong |
| 3.69 ± 0.07 | Medium |
| 3.57 ± 0.07 | Very Strong |
| 3.51 ± 0.07 | Very Strong |

TABLE 1-continued

| d(A) | I/Io |
| --- | --- |
| 3.34 ± 0.07 | Medium |
| 3.17 ± 0.06 | Strong |
| 3.08 ± 0.06 | Medium |
| 3.00 ± 0.06 | Weak |
| 2.92 ± 0.06 | Medium |
| 2.73 ± 0.06 | Weak |
| 2.66 ± 0.05 | Weak |
| 2.60 ± 0.05 | Weak |
| 2.49 ± 0.05 | Weak |

These values were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these, the relative intensities, 100 I/Io, where Io is the intensity of the strongest line or peak, and d (obs.), the interplanar spacing in Angstrom units, corresponding to the recorded lines, were calculated. It should be understood that this X-ray diffraction pattern is characteristic of all the species of ZSM-38 compositions. Ion exchange of the sodium ion with cations reveals substantially the same pattern with some minor shifts in interplanar spacing and variation in relative intensity. Other minor variations can occur depending on the silicon to aluminum ratio of the particular sample, as well as if it has previously been subjected to thermal treatment.

A further characteristic of ZSM-38 is its sorptive capacity proving said zeolite to have increased capacity for 2-methylpentane (with respect to n-hexane sorption by the ratio n-hexane/2-methylpentane) when compared with a hydrogen form of natural ferrierite resulting from calcination of an ammonium exchanged form. The characteristic sorption ratio n-hexane/2-methylpentane for ZSM-38 (after calcination at 600° C) is less than 10, whereas that ratio for the natural ferrierite is substantially greater than 10, for example, as high as 34 or higher.

While synthetic ZSM-38 zeolites may be used in a wide variety of hydrocarbon conversion reactions, they are notably useful in the processes of polymerization, aromatization and cracking. Other hydrocarbon conversion processes for which ZSM-38 may be utilized in one or more of its active forms include, for example, hydrocracking and converting light aliphatics to aromatics such as in U.S. Pat. No. 3,760,024.

Synthetic ZSM-38 zeolites can be used either in the organic cation and alkali metal containing from, the alkali metal form and hydrogen form or another univalent or multivalent cationic form. They can also be used in intimate combination with a hydrogenating component such as tungsten, vanadium, molybdenum, rhenium, nickel, cobalt, chromium, manganese, or a noble metal such as platinum or palladium where a hyrogenation-dehydrogenation function is to be performed. Such components can be exchanged into the composition, impregnated therein or physically intimately admixed therewith. Such components can be impregnated in or on to ZSM-38 such as, for example, by, in the case of platinum, treating the zeolite with a platinum metal-containing ion. Thus, suitable platinum compounds for this purpose include chloroplatinic acid, platinous chloride and various compounds containing the platinum amine complex. Combinations of metals and methods for their introduction can also be used.

As prepared, R can be one or more of a variety of organic cations, especially nitrogen-containing cations, present in quantity of not less than 30% of the whole, examples of which include those cations derived from 2-(hydroxyalkyl)trialkylammonium compounds where alkyl is methyl, ethyl or a combination thereof. Non-limiting examples of the compounds useful for R include the halides, e.g. fluorides, chlorides and bromides, the sulfates, the acetates, the nitrates and others.

Also, M can be one or more of a variety of alkali metal cations, suitably defined as including all alkali metal ions derived from alkali metal oxide or hyroxide as well as alkali metal ions included in alkali metal silicates and aluminates (not including alkali metal salts such as sodium chloride or sodium sulfate which may be derived from neutralization of added inorganic salts such as HCl or $H_2SO_4$ or acid salts such as $Al_2(SO_4)_2$). Non-limiting examples of such suitable alkali metal ions include sodium and potassium.

Zeolite ZSM-38 can be suitably prepared by preparing a solution containing sources of an alkali metal oxide, preferably sodium oxide, an organic oxide, an oxide of aluminum, an oxide of silicon and water and having a composition, in terms of mole ratios of oxides, falling within the following ranges:

|  | Broad | Preferred |
| --- | --- | --- |
| $R^+/(R^+ + M^+)$ | 0.2–1.0 | 0.3–0.9 |
| $OH^-/SiO_2$ | 0.05–0.5 | 0.07–0.49 |
| $H_2O/OH^-$ | 41–500 | 100–250 |
| $SiO_2/Al_2O_3$ | 8.8–200 | 12–60 | wherein R is an organic cation derived from a 2-(hydroxyalkyl)trialkylammonium compound and M is an alkali metal ion, and maintaining the mixture until crystals of the zeolite are formed. The quantity of $OH^-$ is calculated only from the inorganic sources of alkali without any organic base contribution. Thereafter, the crystals are separated from the liquid and recovered. Typical reaction conditions consist of heating the foregoing reaction mixture to a temperature of from about 90° to about 400° F for a period of time of from about 6 hours to about 100 days. A more preferred temperature range is from about 150° to about 400° F with the amount of time at a temperature in such range being from about 6 hours to about 80 days.

Synthetic ZSM-38, as a catalyst in the present hydrocarbon conversion process, should be dehydrated at least partially. This can be done by heating to a temperature in the range of 200° to 600° C in an inert atmosphere, such as air, nitrogen, etc. and at atmospheric or subatmospheric pressures for between 1 and 48 hours. Dehydration can also be performed at lower temperature merely by placing the catalyst in a vacuum, but a longer time is required to obtain a sufficient amount of dehydration.

The composition for the synthesis of synthetic ZSM-38 can be prepared utilizing materials which can supply the appropriate oxide. Such compositions include aluminates, alumina, silicates, silica hydrosol, silica gel, silicic acid and hydroxides. It will be understood that each oxide component utilized in the reaction mixture for preparing ZSM-38 can be supplied by one or more essential reactants and they can be mixed together in any order. For example, sodium oxide can be supplied by an aqueous solution, sodium hydroxide or by an aqueous solution of a suitable silicate; the organic nitrogen-containing cation can be supplied by a compound of that cation, such as, for example, the hydroxide or a salt, as well as by the indicated amines. The reaction mixture can be prepared either batchwise or continuously. Crystal size and crystallization time of the ZSM-38 composition will vary with the nature of the reaction mixture employed.

DESCRIPTION OF SPECIFIC EMBODIMENTS

Synthetic ZSM-38 for use herein can have the original cations associated therewith replaced by a wide variety of other cations according to techniques well known in the art. Typical replacing cations include hydrogen, ammonium and metal cations including mixtures thereof. Of the replacing metallic cations, particular preference is given to cations of metals such as rare earth, Mn, Ca, Mg, Zn, Cd, Pd, Ni, Co, Ti, Al, Sn, Fe and Cu.

Typical ion exchange technique would be to contact the synthetic ZSM-38 zeolite with a salt of the desired replacing cation or cations. Although a wide variety of salts can be employed, particular preference is given to chlorides, nitrates and sulfates.

Representative ion exchange techniques are disclosed in a wide variety of patents including U.S. Pat. Nos. 3,140,249; 3,140,251; and 3,140,253.

Following contact with the salt solution of the desired replacing cation, the zeolite is then preferably washed with water and dried under conditions set forth hereinbefore to produce a catalytically-active thermal decomposition product thereof.

Regardless of the cations replacing the alkali metal in the synthesized form of the ZSM-38, the spacial arrangement of the aluminum, silicon and oxygen atoms which form the basic crystal lattices of ZSM-38 remains essentially unchanged by the described replacement of alkali metal as determined by taking an X-ray powder diffraction pattern of the ion-exchanged material.

The aluminosilicate prepared as indicated above is formed in a wide variety of particle sizes. Generally speaking, the particles can be in the form of a powder, a granule, or a molded product, such as extrudate having particle size sufficient to pass through a 2 mesh (Tyler) screen and be retained on a 400 mesh (Tyler) screen. In cases where the catalyst is molded, such as by extrusion, the aluminosilicate can be extruded before drying or dried or partially dried and then extruded.

In the case of many catalysts, it is desired to incorporate the ZSM-38 with another material resistant to the temperatures and other conditions employed in organic conversion processes. Such matrix materials include active and inactive materials and synthetic or naturally occurring zeolites as well as inorganic materials such as clays, silica and/or metal oxides. The latter may be either naturally occurring or in the form of gelatinous precipitates, sols or gels including mixtures of silica and metal oxides. Use of a material in conjunction with the ZSM-38, i.e. combined therewith, which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. Frequently, zeolite materials have been incorporated into naturally occurring clays, e.g. bentonite and kaolin. These materials, i.e. clays, oxides, etc., function, in part, as binders for the catalyst. It is desirable to provide a catalyst having good crush strength, because in a petroleum refinery the catalyst is often subjected to rough handling, which tends to break the catalyst down into powder-like materials which cause problems in processing.

Naturally occurring clays which can be composited with the synthetic ZSM-38 catalyst include the montmorillonite and kaolin families which include the sub-bentonites, and the kaolins commonly known as Dixie, McNamee, Georgia and Florida clays or others in which the main mineral constituents is halloysite, kaolinite, dickite, nacrite, or anauxite. Such clays can be used in the raw state as originally mined or initially subjected to calcination, acid treatment or chemical modification.

In addition to the foregoing materials, the ZSM-38 catalyst for use herein can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel. A mixture of these components could also be used. The relative proportions of finely divided crystalline aluminosilicate ZSM-38 and inorganic oxide gel matrix vary widely with the crystalline aluminosilicate content ranging from about 1 to about 90 percent by weight and more usually in the range of about 2 to about 50 percent by weight of the composite.

In general, hydrocarbon compounds may be catalytically converted in the presence of the ZSM-38 catalyst material, including the product of thermal treatment thereof, over a range of catalytic conversion conditions, including a reaction temperature of from about 95° to about 1200° F, preferably from about 390° to about 1000° F, a reaction pressure of from atmospheric to about 10,000 psig, preferably from about atmospheric to about 3,500 psig, and a hydrogen/hydrocarbon compound mole ratio of from 0 to about 20, preferably from 0 to about 10. When the conversion is conducted in a flow apparatus, e.g. a down-flow reactor, or under conditions comparable to those existing in a flow apparatus, the weight hourly space velocity (WHSV) should be maintained at between about 0.1 hr$^{-1}$ and about 50 hr$^{-1}$, preferably between about 0.5 hr$^{-1}$ and about 10 hr$^{-1}$. When the conversion is conducted in a batch apparatus, e.g. a stirred batch reactor, or under conditions comparable to those existing in a batch apparatus, the contact time should be maintained at between about 0.01 hour and about 48 hours, preferably between about 0.1 hour and about 24 hours.

In particular, when the conversion of hydrocarbon compounds by the present method is olefin polymerization, catalytic conversion conditions should be maintained within certain ranges, including a temperature of from about 95° to about 935° F, preferably from about 390° F to about 810° F, a pressure of from about atmospheric to about 4,000 psig, preferably from about atmospheric to about 2,000 psig, a WHSV (when a flow operation) of from about 0.1 hr$^{-1}$ to about 50 hr$^{-1}$, preferably from about 0.5 hr$^{-1}$ to about 10 hr$^{-1}$, and a contact time (when a batch operation) of from about 0.1 hour to about 48 hours, preferably from about 0.5 hour to about 24 hours and a hydrogen/hydrocarbon (i.e. olefin) mole ratio of from about 0 to about 20, preferably from about 0 to about 10.

When the conversion is olefin or paraffin aromatization, catalytic conversion conditions should be maintained within certain ranges, including a temperature of from about 600° F to about 1200° F, preferably from about 800° F to about 1000° F, a pressure of from about atmospheric to about 10,000 psig, preferably from about atmospheric to about 2000 psig, a WHSV (when a flow operation) of from about 0.1 hr$^{-1}$ to about 10 hr$^{-1}$, preferably from about 1 hr$^{-1}$ to about 5 hr$^{-1}$, a contact time (when a batch operation) of from about 0.1 hour to about 48 hours, preferably from about 1 hour to about 24 hours and a hydrogen/hydrocarbon (i.e. olefin or paraffin) mole ratio of from about 0 to about 20, preferably from about 0 to about 10.

Further, when the conversion of hydrocarbon compound by the present method is cracking, catalytic conversion conditions should be maintained within certain ranges, including a temperature of from about 700° to about 1200° F, preferably from about 800° to about 1000° F, a pressure of from about atmospheric to about 200 psig, a WHSV (when a flow operation) of from about 0.5 hr$^{-1}$ to about 50 hr$^{-1}$, preferably from about 1 hr$^{-1}$ to about 10 hr$^{-1}$, and a contact time (when a batch operation) of from about 0.01 hour to about 24 hours, preferably from about 0.1 hour to about 10 hours. When the conversion is hydrocracking, catalytic conversion conditions should be maintained within somewhat different ranges, including a temperature of from about 400° to about 1000° F, preferably from about 500° to about 850° F, a pressure of from about 500 psig to about 3500 psig, a WHSV (when a flow operation) of from about 0.1 hr$^{-1}$ to about 10 hr$^{-1}$, preferably from about 0.2 hr$^{-1}$ to about 5 hr$^{-1}$, a contact time (when a batch operation) of from about 0.1 hour to about 10 hours, preferably from about 0.2 hour to about 5 hours and a hydrogen/hydrocarbon mole ratio of from about 1 to about 20, preferably from about 3 to about 10.

In order to more fully illustrate the nature of the invention and the manner of practicing same, the following examples are presented.

In the examples which follow, whenever adsorption data are set forth for comparison of sorptive capacities for water, cyclohexane and n-hexane, they were determined as follows:

A weighted sample of the calcined zeolite was contacted with the desired pure adsorbate vapor in an adsorption chamber, evacuated to 12 mm when checking capacity for water and 20 mm when checking capacity for cyclohexane and n-hexane, pressures less than the vapor-liquid equilibrium pressure of the respective adsorbate at room temperature. The pressure was kept constant (within about ± 0.5 mm) by addition of adsorbate vapor controlled by a manostat during the adsorption period which did not exceed about eight hours. As adsorbate was adsorbed by the zeolite, the decrease in pressure caused the manostat to open a valve which admitted more adsorbate vapor to the chamber to restore the above control pressures. Sorption was complete when the pressure change was not sufficient to activate the monostat. The increase in weight was calculated as the adsorption capacity of the sample.

When the sorptive capacities for 2-methylpentane and n-hexane were measured for distinguishing comparisons of ratios of n-hexane/2-methylpentane sorption, a weighed sample of zeolite was heated to 600° C and held at that temperature until the evolution of basic nitrogeneous gases ceased. The zeolite was then cooled and the sorption test run essentially as above with the sorption being conducted at 90° C and the sorbate being chilled at 0° C.

EXAMPLE 1

Illustrating a preparation of ZSM-38, a first solution was prepared comprising 34.4 grams sodium silicate (28.8% SiO$_2$, 8.9% Na$_2$O and 62.2% H$_2$O), 2.4 grams sodium aluminate (44.7% Al$_2$O$_3$, 31.3% Na$_2$O and 24.0% H$_2$O), 9.7 grams NaOH and 76.4 grams water. A second solution was prepared by first mixing 23.74 grams Al$_2$(SO$_4$)$_3$.14 H$_2$O, 12.5 grams H$_2$SO$_4$ and 75.0 grams water and then adding to that mixture 135.0 grams of the sodium silicate. At this point, the second solution was added to the first solution to provide a gel which was mixed until homogeneous and aged at 99° C for 1-2 hours. The solid which formed was filtered out and the filtrate was discarded. A third solution, made up of 18.72 grams of 2-(hydroxyethyl)trimethylammonium chloride, 10.0 grams of 10% NaOH solution and 20.0 grams water, was then added to the above solid and the resulting mixture was mixed until homogeneous and crystallized (99° C for 83 days).

The crystallization mixture was comprised of the following components in mole ratios:

| | | |
|---|---|---|
| $\dfrac{R^+}{R^+ + M^+}$ | = 0.31, | wherein M is sodium and R is [(CH$_3$)$_3$—N—CH$_2$CH$_2$OH] |
| $\dfrac{OH^-}{SiO_2}$ | = 0.36 | |
| $\dfrac{H_2O}{OH^-}$ | = 52.2 | |
| $\dfrac{SiO_2}{Al_2O_3}$ | = 16.4 | |

The crystalline product was filter separated, water washed and X-ray analyzed. The X-ray analysis showed the crystalline product of this example to have the diffraction pattern shown below:

| X-RAY DIFFRACTION PATTERN OF ZSM-38 OF EXAMPLE 1 | | |
|---|---|---|
| 2 Times Theta | d(A) | I/Io |
| 9.02 | 9.80 | 45 |
| 9.70 | 9.12 | 29 |
| 11.10 | 7.97 | 2 |
| 12.50 | 7.08 | 34 |
| 13.25 | 6.68 | 34 |
| 14.70 | 6.03 | 15 |
| 15.20 | 5.83 | 11 |
| 17.75 | 5.00 | 13 |
| 18.77 | 4.73 | 11 |
| 20.33 | 4.37 | 7 |
| 21.00 | 4.23 | 5 |
| 22.15 | 4.01 | 82 |
| 23.35 | 3.81 | 68 |
| 24.10 | 3.69 | 23 |
| 24.97 | 3.57 | 100 |
| 25.40 | 3.51 | 100 |
| 26.70 | 3.34 | 26 |
| 28.17 | 3.17 | 48 |
| 28.97 | 3.08 | 24 |
| 29.76 | 3.00 | 17 |
| 30.60 | 2.921 | 29 |
| 32.75 | 2.734 | 5 |
| 33.73 | 2.657 | 11 |
| 34.55 | 2.596 | 6 |
| 36.00 | 2.495 | 7 |
| 36.90 | 2.436 | 3 |
| 37.87 | 2.376 | 4 |
| 38.60 | 2.332 | 4 |
| 39.70 | 2.270 | 2 |
| 42.50 | 2.127 | 4 |
| 43.80 | 2.067 | 2 |
| 44.50 | 2.036 | 7 |

Chemical analysis of the product of this example provided the following compositional figures:

| Composition | Wt. % | Mole Ratio on Al$_2$O$_3$ Basis |
|---|---|---|
| N | 1.35 | — |
| Na | 2.60 | — |
| Al$_2$O$_3$ | 12.60 | 1.0 |
| SiO$_2$ | 83.5 | 11.85 |
| N$_2$O | — | 0.53 |
| Na$_2$O | — | 0.48 |
| H$_2$O | — | 5.28 |

Physical analysis of the product of this example indicated that the surface area of the crystals after calcination at 1000° F for 16 hours was 372 m$^2$/g. Adsorption tests provided the following data:

| Adsorption | Wt. % |
|---|---|
| Cyclohexane | 5.2 |
| n-Hexane | 7.2 |
| Water | 11.2 |
| n-Hexane/2-methyl-pentane (90° C) = | 1.89 |

EXAMPLE 2

In another illustration of the preparation of ZSM-38, a first solution was prepared comprising 103.2 grams sodium silicate (as defined in Example 1), 7.2 grams sodium aluminate (as defined in Example 1), 29.1 grams sodium hydroxide and 229.2 grams water. A second solution was prepared by first mixing 71.22 grams Al$_2$(SO$_4$)$_3$.14 H$_2$O, 37.5 grams H$_2$SO$_4$ and 225 grams water and then adding to that mixture 405 grams of the sodium silicate. The second solution was then added to the first solution and the resultant gel was mixed until homogeneous and aged at 99° C for 1–2 hours. The solid which formed was then filtered out of solution and the filtrate was discarded. A third solution, made up of 56.2 grams 2-(hydroxyethyl)trimethylammonium chloride, 30.0 grams of 10% sodium hydroxide solution and 60.0 grams water, was then added to the above solid and the resulting mixture was mixed until homogeneous and crystallized (99° C for 70 days).

The crystallization mixture was comprised of the following components in mole ratios:

| | | |
|---|---|---|
| $\frac{R^+}{R^+ + M^+}$ | = 0.31, | wherein M and R are as defined in Ex. 1 |
| $\frac{OH^-}{SiO_2}$ | = 0.35 | |
| $\frac{H_2O}{OH^-}$ | = 52.2 | |
| $\frac{SiO_2}{Al_2O_3}$ | = 16.1 | |

The crystalline product was filter separated, water washed and X-ray analyzed. The X-ray analysis showed the crystalline product of this example to have the diffraction pattern of Table 1.

Chemical analysis of the product of this example provided the following compositional figures:

| Composition | Wt. % | Mole Ratio on Al$_2$O$_3$ Basis |
|---|---|---|
| N | 1.41 | — |
| Na | 2.20 | — |
| Al$_2$O$_3$ | 11.6 | 1.0 |
| SiO$_2$ | 87.5 | 12.83 |
| N$_2$O | — | 0.77 |
| Na$_2$O | — | 0.42 |
| H$_2$O | — | 6.20 |

Physical analysis of the product of this example calcined 16 hours at 1000° F indicated that the surface area of the crystals was 403 m$^2$/g. Adsorption tests provided the following data:

| Adsorption | Wt. % |
|---|---|
| Cyclohexane | 7.1 |
| n-Hexane | 7.1 |
| Water | 13.4 |
| n-Hexane/2-methyl-pentane (90° C) = | 2.70 |

EXAMPLE 3

Another illustration of the preparation of ZSM-38 follows with first, second, and third solutions being prepared and mixed according to those of Example 2. The final product crystallization, however, was produced by holding the crystallizing liquid at 99° C for 78 days. X-ray analysis showed the crystalline product to have the diffraction pattern shown in Table 1, and adsorption tests demonstrated the following properties:

| Adsorption | Wt. % |
|---|---|
| Cyclohexane | 4.0 |
| n-Hexane | 7.0 |
| Water | 14.7 |
| n-Hexane/2-methyl-pentane (90° C) = | 1.75 |

EXAMPLE 4

The product crystalline zeolite ZSM-38 of Example 2 was calcined at 1000° F for 10 hours and exchanged with ammonium chloride solution to yield an ammonium exchanged ZSM-38 product. The exchanged zeolite was then dried at 230° F for 16 hours and calcined at 1000° F for 10 hours to give the hydrogen form of the ZMS-38 zeolite (HZSM-38).

This HZSM-38 then was used as a catalyst in a polymerization reaction as hereinbefore generally described utilizing propylene as the feed with a reaction temperature of 600° F, reaction pressure of one atmosphere and space velocity of about 1. The propylene feed was converted to liquid product at conversion of 88.1 weight percent with a product composition of C$_4$–C$_{11}$ olefinic compounds having a clear research octane number of 95 (motor octane number of 81) and a density of 0.72g/cc. The refractive index of the reaction product was 1.4173.

EXAMPLE 5

The HZSM-38 zeolite of Example 4 was also used as a catalyst in an aromatization reaction as hereinbefore generally described utilizing propylene as the feed with a reaction temperature of 1100° F, reaction pressure of one atmosphere and space velocity of 3.48. The propylene feed was converted to liquid product comprising predominantly aromatic mixtures at a conversion of approximately 5.1 weight percent of liquid product have a clear research octane number of 110 (motor octane number of 91) and a density of 0.87 g/cc. The refractive index of the reaction product was 1.48.

EXAMPLE 6

Another ZSM-38 quantity was prepared by reacting the following solutions:
Solution A
56.8 grams NaAlO$_2$ (33.1 wt % Na$_2$O, 43.1% Al$_2$O$_3$, 24.3 wt % H$_2$O)
47.52 grams NaOH
594.0 grams H$_2$O
Solution B
850.0 grams colloidal silica sol (30 wt % SiO$_2$)
Solution C
125.4 grams 2-(hydroxyethyl)trimethylammonium chloride These solutions were mixed together by adding Solution C to Solution A with thorough agitation, and then adding Solution B followed by a 20 minute mixing period. The resulting mixture was reacted in a stirred stainless steel autoclave for 10 days at 250° F.

The resulting crystalline product was separated from reaction solution by filtration and washing and subjected to X-ray analysis. It exhibited the X-ray diffraction pattern of Table 1.

A portion of the zeolite product of this example, dried at 230° F, had a composition including 7.53 wt % carbon and 1.80 wt % nitrogen. Another portion of the zeolite product, calcined at 1000° F, had a surface area of 363 m$^2$/g and exhibited the following composition and sorption properties:

| Composition | |
|---|---|
| 2.55 wt % Na | |
| 81.8 wt % SiO$_2$ | |
| 11.1 wt % Al$_2$O$_3$ | |
| Adsorption | Wt. % |
| Cyclohexane | 3.8 |
| n-Hexane | 8.4 |
| Water | 18.5 |

EXAMPLE 7

A portion of the zeolite product of Example 6 was calcined for 3 hours at 700° F with flowing nitrogen prior to base exchanging with NH$_4$Cl solution. In the exchange process, 108.8 grams of the calcined sodium ZSM-38 was contacted four times for 2 hours each at 180°–200° F with a 10 wt % NH$_4$Cl solution using 10 ml of solution per gram of zeolite. The exchanged zeolite was then water washed substantially free of chloride ion followed by drying at 230° F. It was then pelleted, sized and calcined for 10 hours at 1000° F to form the acid ZSM-38 (HZSM-38).

The HZSM-38 thus prepared was tested for its relative activity in cracking n-hexane by the alpha test described by P. B. Weisz and J. N. Miale in *Journal of Catalysis*, 4, 527–529 (1965).

In this test n-hexane was charged over 0.5 cc (.1215 grams) of catalyst at a weight hourly space velocity of 4.6 at 1000° F. The conversion of n-hexane was 26.0% at 5 minutes on stream, to give a relative cracking activity (alpha) of 11.5.

EXAMPLE 8

Fifteen grams of the ZSM-38 of Example 7 in the ammonium form was contacted for 16–18 hours at room temperature with 150 cc of 1% RECl$_3$.6H$_2$O solution. This contact was followed with a water wash essentially free of chloride ion, dried at 230° F, pelleted and sized 14 to 25 mesh and finally calcined for 10 hours at 1000° F in air.

The final product had a surface area of 328 m$^2$/g and a (RE)$_2$O$_3$ content of 0.53 wt %.

The RE ZSM-38 thus prepared was tested for its relative activity in cracking n-hexane in the same manner as for Example 7. The resulting conversion of n-hexane was 26.7%, to give a relative cracking activity of 11.8.

EXAMPLE 9

A further ZSM-38 preparation was synthesized by interacting the following solutions:
Solution A
482.8 grams NaAlO$_2$ (as in Example 6)
403.9 grams NaOH
5049 grams H$_2$O
Solution B
7293 grams Colloidal Silica
Solution C
1065.9 grams 2-(hydroxyethyl)trimethylammonium chloride.

These were mixed together by adding C to A with rapid stirring then adding B, followed by 20 minute mixing in a stirred 5 gallon autoclave. The contents were heated to and held at 240°–255° F for 7 days.

The resulting crystalline product was discharged from the reactor, washed and filtered. It exhibited the X-ray diffraction pattern of Table 1.

In preparing a catalyst from the zeolite product of this example, 258.5 grams of the zeolite product were calcined for 3 hours at 1000° F in a nitrogen atmosphere and then ammonium ion exchanged with four 2 hour contacts using 10 cc/g of 10% NH$_4$Cl solution. The exchanged zeolite was water washed free of chloride ion and then dried at 230° F, pelleted and sized 14 to 25 mesh, calcined for 10 hours at 1000° F in air. A six gram quantity of the calcined HZSM-38 product was evacuated for ½ hour, and then impregnated with 0.292 grams Ni(NO$_3$)$_2$.6H$_2$O dissolved in water and diluted to 7.8 ml, employing a 2 minute shaking process. It was then aged at room temperature for 2 hours, dried at 230° F overnight and then calcined at 1000° F for 10 hours.

The final product contained 0.88 wt % Ni and had a surface area of 378 m$^2$/g.

The Ni ZSM-38 thus prepared was tested for its relative activity in cracking n-hexane in the same manner as for Example 7, but at a weight hourly space velocity of 1.6 using 1.0 cc catalyst. The resulting conversion of n-hexane was 14.2 %, to give a relative cracking activity of 2.9.

What is claimed is:

1. A process for effecting catalytic conversion of a hydrocarbon compound charge which comprises contacting said charge under catalytic conversion conditions with a catalyst comprising a synthetic crystalline aluminosilicate zeolite having a composition expressed in terms of mole ratios of oxides in the anhydrous state as follows:

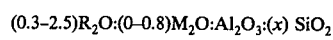

$$(0.3-2.5)R_2O:(0-0.8)M_2O:Al_2O_3:(x)\,SiO_2$$

wherein R is an organic cation, M is an alkali metal cation and x is greater than 8 and having an X-ray powder diffraction pattern substantially as shown in Table 1 of the specification, or a thermal decomposition product thereof.

2. The process of claim 1 wherein said zeolite has a composition in terms of mole ratios of oxides in the anhydrous state as follows:

(0.4–2.5)R$_2$O: (0–0.6)M$_2$O: Al$_2$O$_3$: ($y$) SiO$_2$ wherein $y$ is from greater than 8 to about 50.

3. The process of claim 1 wherein R is the organic cation derived from a 2-(hydroxyalkyl)trialkylammonium compound wherein alkyl is methyl or ethyl or a combination thereof.

4. The process of claim 1 wherein R is the organic cation derived from 2-(hydroxyethyl)trimethylammonium chloride.

5. The process of claim 1 wherein said zeolite has its original cations replaced, at least in part, by ion exchange with a cation or a mixture of cations selected from the group consisting of hydrogen and hydrogen precursors, rare earth metals and metals from Groups IIA, IIIA, IVA, IB, IIB, IIIB, IVB, VIB and VIII of the Periodic Table of Elements.

6. The process of claim 5 wherein said zeolite has its original cations replaced, at least in part, by ion exchange with hydrogen or hydrogen precursor cations.

7. The process of claim 5 wherein said zeolite has its original cations replaced, at least in part, by ion exchange with rare earth metal cations.

8. The process of claim 5 wherein said zeolite has its original cations replaced, at least in part, by Group VIII metal cations.

9. The process of claim 8 wherein said metal cations are nickel.

10. The process of claim 1 wherein said catalytic conversion is conducted in a flow apparatus and said conversion conditions include a temperature of from about 95° F to about 1,200° F, a pressure of from about atmospheric to about 10,000 psig, a hydrogen/hydrocarbon compound mole ratio of from 0 to about 20 and a weight hourly space velocity of from about 0.1 hr$^{-1}$ to about 50 hr$^{-1}$.

11. The process of claim 1 wherein said catalytic conversion is conducted in a batch apparatus and said conversion conditions include a temperature of from about 95° F to about 1,200° F, a pressure of from about atmospheric to about 10,000 psig, a hydrogen/hydrocarbon compound mole ratio of from 0 to about 20 and a contact time of from about 0.01 hour to about 48 hours.

12. The process of claim 10 wherein said conversion is aromatization and said conversion conditions include a temperature of from about 600° to about 1,200° F, a pressure of from about atmospheric to about 10,000 psig, a hydrogen/hydrocarbon mole ratio of from about 0 to about 20 and a weight hourly space velocity of from about 0.1 hr$^{-1}$ to about 10 hr$^{-1}$.

13. The process of claim 11 wherein said conversion is aromatization and said conversion conditions include a temperature of from about 600° to about 1,200° F, a pressure of from about atmospheric to about 10,000 psig, a hydrogen/hydrocarbon mole ratio of from about 0 to about 20 and a contact time of from about 0.1 hour to about 48 hours.

14. The process of claim 10 wherein said conversion is cracking and said conversion conditions include a temperature of from about 700° to about 1,200° F, a pressure of from about atmospheric to about 200 psig and a weight hourly space velocity of from about 0.5 hr$^{-1}$ to about 50 hr$^{-1}$.

15. The process of claim 11 wherein said conversion is cracking and said conversion conditions include a temperature of from about 700° to about 1,200° F, a pressure of from about atmospheric to about 200 psig and a contact time of from about 0.01 hour to about 24 hours.

16. The process of claim 10 wherein said conversion is hydrocracking and said conversion conditions include a temperature of from about 400° to about 1,000° F, a pressure of from about 500 psig to about 3,500 psig, a hydrogen/hydrocarbon mole ratio of from about 1 to about 20 and a weight hourly space velocity of from about 0.1 hr$^{-1}$ to about 10 hr$^{-1}$.

17. The process of claim 11 wherein said conversion is hydrocracking and said conversion conditions include a temperature of from about 400° to about 1,000° F, a pressure of from about 500 psig to about 3,500 psig, a hydrogen/hydrocarbon mole ratio of from about 1 to about 20 and a contact time of from about 0.1 hour to about 10 hours.

18. The process of claim 5 wherein said catalytic conversion is conducted in a flow apparatus and said conversion conditions include a temperature of from about 95° F to about 1,200° F, a pressure of from about atmospheric to about 10,000 psig, a hydrogen/hydrocarbon compound mole ratio of from 0 to about 20 and a weight hourly space velocity of from about 0.1 hr$^{-1}$ to about 50 hr$^{-1}$.

19. The process of claim 5 wherein said catalytic conversion is conducted in a batch apparatus and said conversion conditions include a temperature of from about 95° F to about 1,200° F, a pressure of from about atmospheric to about 10,000 psig, a hydrogen/hydrocarbon compound mole ratio of from 0 to about 20 and a contact time of from about 0.01 hour to about 48 hours.

20. The process of claim 18 wherein said conversion is aromatization and said conversion conditions include a temperature of from about 600° to about 1,200° F, a pressure of from about atmospheric to about 10,000 psig, a hydrogen/hydrocarbon mole ratio of from about 0 to about 20 and a weight hourly space velocity of from about 0.1 hr$^{-1}$ to about 10 hr$^{-1}$.

21. The process of claim 19 wherein said conversion is aromatization and said conversion conditions include a temperature of from about 600° to about 1,200° F, a pressure of from about atmospheric to about 10,000 psig, a hydrogen/hydrocarbon mole ratio of from about 0 to about 20 and a contact time of from about 0.1 hour to about 48 hours.

22. The process of Claim 18 wherein said conversion is cracking and said conversion conditions include a temperature of from about 700° to about 1,200° F, a pressure of from about atmospheric to about 200 psig and a weight hourly space velocity of from about 0.5 hr$^{-1}$ to about 50 hr$^{-1}$.

23. The process of claim 19 wherein said conversion is cracking and said conversion conditions include a temperature of from about 700° to about 1,200° F, a pressure of from about atmospheric to about 200 psig and contact time of from about 0.01 hour to about 24 hours.

24. The process of claim 18 wherein said conversion is hydrocracking and said conversion conditions include a temperature of from about 400° to about 1,000° F, a pressure of from about 500 psig to about 3,500 psig, a hydrogen/hydrocarbon mole ratio of from about 1 to about 20 and a weight hourly space velocity of from about 0.1 hr$^{-1}$ to about 10 hr$^{-1}$.

25. The process of claim 19 wherein said conversion is hydrocracking and said conversion conditions include a temperature of from about 400° to about 1,000° F, a pressure of from about 500 psig to about 3,500 psig, a hydrogen/hydrocarbon mole ratio of from about 1 to about 20 and a contact time of from about 0.1 hour to about 10 hours.

26. The process of claim 6 wherein said conversion is cracking and said conversion conditions include a temperature of from about 700° to about 1,200° F, a pressure of from about atmospheric to about 200 psig and a weight hourly space velocity of from about 0.5 hr$^{-1}$ to about 50 hr$^{-1}$.

27. The process of claim 6 wherein said conversion is cracking and said conversion conditions include a temperature of from about 700° to about 1,200° F, a pressure of from about atmospheric to about 200 psig and contact time of from about 0.01 hour to about 24 hours.

28. The process of claim 7 wherein said conversion is cracking and said conversion conditions include a temperature of from about 700° F to about 1,200° F, a pressure of from about atmospheric to about 200 psig and a weight hourly space velocity of from about 0.5 hr$^{-1}$ to about 50 hr$^{-1}$.

29. The process of claim 7 wherein said conversion is cracking and said conversion conditions include a temperature of from about 700° to about 1,200° F, a pressure of from about atmospheric to about 200 psig and contact time of from about 0.01 hour to about 24 hours.

* * * * *

UNITED STATES PATENT AND TRADEMARK OFFICE
CERTIFICATE OF CORRECTION

PATENT NO. : 4,105,541
DATED : August 8, 1978
INVENTOR(S) : CHARLES J. PLANK, MAE K. RUBIN
AND EDWARD J. ROSINSKI It is certified that error appears in the above-identified patent and that said Letters Patent are hereby corrected as shown below:

Column 3, line 51: "from" should read -- form --.

Column 11, line 11: "850.0" should read -- 858.0 --.

Signed and Sealed this

Twentieth Day of March 1979

[SEAL]

Attest:

RUTH C. MASON
Attesting Officer

DONALD W. BANNER
Commissioner of Patents and Trademarks